United States Patent
Singh

(10) Patent No.: US 10,438,072 B2
(45) Date of Patent: Oct. 8, 2019

(54) VIDEO DATA BACKGROUND TRACKING AND SUBTRACTION WITH MULTIPLE LAYERS OF STATIONARY FOREGROUND AND BACKGROUND REGIONS

(71) Applicant: Echelon Corporation, Santa Clara, CA (US)

(72) Inventor: Shalender Singh, Milpitas, CA (US)

(73) Assignee: Echelon Corporation, Santa Clara, CA (US)

( * ) Notice: Subject to any disclaimer, the term of this patent is extended or adjusted under 35 U.S.C. 154(b) by 103 days.

(21) Appl. No.: 15/442,880

(22) Filed: Feb. 27, 2017

(65) Prior Publication Data
US 2018/0247136 A1    Aug. 30, 2018

(51) Int. Cl.
| | |
|---|---|
| *G06K 9/00* | (2006.01) |
| *G06T 7/194* | (2017.01) |
| *G08G 1/04* | (2006.01) |
| *G06T 7/11* | (2017.01) |
| *G06T 7/143* | (2017.01) |

(Continued)

(52) U.S. Cl.
CPC ....... *G06K 9/00785* (2013.01); *G06K 9/6202* (2013.01); *G06T 7/11* (2017.01); *G06T 7/143* (2017.01); *G06T 7/174* (2017.01); *G06T 7/194* (2017.01); *G08G 1/04* (2013.01); *G06T 2207/10016* (2013.01); *G06T 2207/10024* (2013.01); *G06T 2207/20076* (2013.01); *G06T 2207/30232* (2013.01); *G06T 2207/30236* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 6,987,883 B2 * | 1/2006 | Lipton | G06T 7/11 382/171 |
| 6,999,620 B1 | 2/2006 | Harville | |
| 7,123,166 B1 | 10/2006 | Haynes et al. | |

(Continued)

FOREIGN PATENT DOCUMENTS

| | | |
|---|---|---|
| KR | 20100086089 | 7/2010 |
| WO | WO 2004062259 | 7/2004 |

(Continued)

OTHER PUBLICATIONS

Hu, Xuegang, and Jiamin Zheng. "An Improved Moving Object Detection Algorithm Based on Gaussian Mixture Models." Open Journal of Applied Sciences 6.07 (2016): 449. (Year: 2016).*

(Continued)

*Primary Examiner* — Samah A Beg
(74) *Attorney, Agent, or Firm* — Locke Lord LLP

(57) ABSTRACT

Transient connected regions are tracked in a video sequence, marking them as foreground layer or background layer when the transient regions become stable. A stack of background/foreground Gaussian mixer models is maintained for each pixel. The decision to mark a stable region as background layer or a new or existing foreground layer is done by matching the region with each model in the model stack. If the new region matches an existing model, then the layers above the matched layers are purged, or else the new region is pushed as a new foreground layer with a new model.

21 Claims, 10 Drawing Sheets

(51) Int. Cl.
G06T 7/174 (2017.01)
G06K 9/62 (2006.01)

(56) References Cited

U.S. PATENT DOCUMENTS

| | | | |
|---|---|---|---|
| 7,885,463 B2 | 2/2011 | Zhang et al. | |
| 8,059,153 B1* | 11/2011 | Barreto | H04N 5/232 |
| | | | 348/169 |
| 8,150,103 B2 | 4/2012 | Zhang et al. | |
| 8,306,333 B2 | 11/2012 | Lai et al. | |
| 8,478,034 B2 | 7/2013 | Chang et al. | |
| 8,594,423 B1* | 11/2013 | Carpenter | G06K 9/6212 |
| | | | 358/453 |
| 8,599,255 B2 | 12/2013 | Lin | |
| 8,655,069 B2 | 2/2014 | Rother et al. | |
| 9,424,745 B1 | 8/2016 | Kagoshima et al. | |
| 9,478,039 B1* | 10/2016 | Wang | G06T 7/11 |
| 2004/0151342 A1 | 8/2004 | Venetianer et al. | |
| 2007/0237393 A1* | 10/2007 | Zhang | G06K 9/38 |
| | | | 382/173 |
| 2007/0280531 A1* | 12/2007 | Zitnick | G06T 11/60 |
| | | | 382/162 |
| 2008/0231709 A1* | 9/2008 | Brown | G06K 9/00771 |
| | | | 348/169 |
| 2009/0138805 A1* | 5/2009 | Hildreth | G06K 9/00335 |
| | | | 715/745 |
| 2009/0222388 A1* | 9/2009 | Hua | G06N 5/02 |
| | | | 706/12 |
| 2009/0297023 A1 | 12/2009 | Lipton et al. | |
| 2010/0098331 A1 | 4/2010 | Meng et al. | |
| 2011/0044537 A1* | 2/2011 | Cobb | G06K 9/00771 |
| | | | 382/165 |
| 2011/0064268 A1 | 3/2011 | Cobb et al. | |
| 2011/0075921 A1 | 3/2011 | Sun et al. | |
| 2011/0243451 A1 | 10/2011 | Oyaizu | |
| 2011/0280478 A1 | 11/2011 | Chen et al. | |
| 2013/0002865 A1 | 1/2013 | Pakulski et al. | |
| 2013/0011049 A1* | 1/2013 | Kimura | G06T 7/194 |
| | | | 382/155 |
| 2013/0094780 A1* | 4/2013 | Tang | G06T 11/60 |
| | | | 382/284 |
| 2013/0128080 A1* | 5/2013 | Hsu | H04N 5/2351 |
| | | | 348/234 |
| 2013/0162867 A1* | 6/2013 | Gupta | H04N 5/2621 |
| | | | 348/239 |
| 2013/0308856 A1* | 11/2013 | Carpenter | G06K 9/00335 |
| | | | 382/164 |
| 2014/0046874 A1 | 2/2014 | Li et al. | |
| 2014/0249742 A1 | 9/2014 | Krivacic et al. | |
| 2016/0217575 A1* | 7/2016 | Bernal | G06T 7/90 |
| 2016/0300489 A1 | 10/2016 | Shafran | |
| 2017/0310972 A1* | 10/2017 | Wang | H04N 19/105 |
| 2018/0048894 A1* | 2/2018 | Chen | G06T 7/11 |
| 2018/0151063 A1* | 5/2018 | Pun | G06F 3/00 |
| 2018/0276482 A1* | 9/2018 | Singh | G06K 9/00785 |
| 2018/0308236 A1* | 10/2018 | Jales Costa | G06T 7/11 |

FOREIGN PATENT DOCUMENTS

| | | |
|---|---|---|
| WO | WO 2006122212 | 11/2006 |
| WO | WO 2007000938 | 1/2007 |
| WO | WO 2007126525 | 11/2007 |

OTHER PUBLICATIONS

Godbehere, A. B., Matsukawa, A., & Goldberg, K. (Jun. 2012). Visual tracking of human visitors under variable-lighting conditions for a responsive audio art installation. 2012 American Control Conference (ACC), (pp. 4305-4312). doi:10.1109/ACC.2012.6315174.

KaewTraKulPong, P., & Bowden, R. (2002). An Improved Adaptive Background Mixture Model for Real-time Tracking with Shadow Detection. In P. Remagnino, G. A. Jones, N. Paragios, & C. S. Regazzoni (Eds.), Video-Based Surveillance Systems: Computer Vision and Distributed Processing (pp. 135-144). Boston, M, A: Springer US. doi:10.1007/978-1-4615-0913-4_11.

Zivkovic, Z. (Aug. 2004). Improved adaptive Gaussian mixture model for background subtraction. Pattern Recognition, 2004. ICPR 2004. Proceedings of the 17th International Conference on, 2, pp. 28-31 vol. 2. doi:10.1109/ICPR.2004.1333992.

Zivkovic, Z., & Ferdinand van der Heijden, F. (2006). Efficient adaptive density estimation per image pixel for the task of background subtraction . Pattern Recognition Letters , 27, 773-780. doi:http://dx.doi.org/10.1016/j.patrec.2005.11.005.

Elgammal, Ahmed, et al. "Background and foreground modeling using nonparametric kernel density estimation for visual surveillance." Proceedings of the IEEE 90.7 (2002): 1151-1163.

Stauffer, Chris, and W. Eric L. Grimson. "Learning patterns of activity using real-time tracking." IEEE Transactions on pattern analysis and machine intelligence 22.8 (2000): 747-757.

Li, Liyuan, et al. "Statistical modeling of complex backgrounds for foreground object detection." IEEE Transactions on Image Processing 13.11 (2004): 1459-1472.

KaewTraKulPong, Pakorn, and Richard Bowden. "An improved adaptive background mixture model for real-time tracking with shadow detection." Video-based surveillance systems 1 (2002): 135-144.

International Search Report and Written Opinion for International Application No. PCT/US2018/019718 dated May 16, 2018.

* cited by examiner

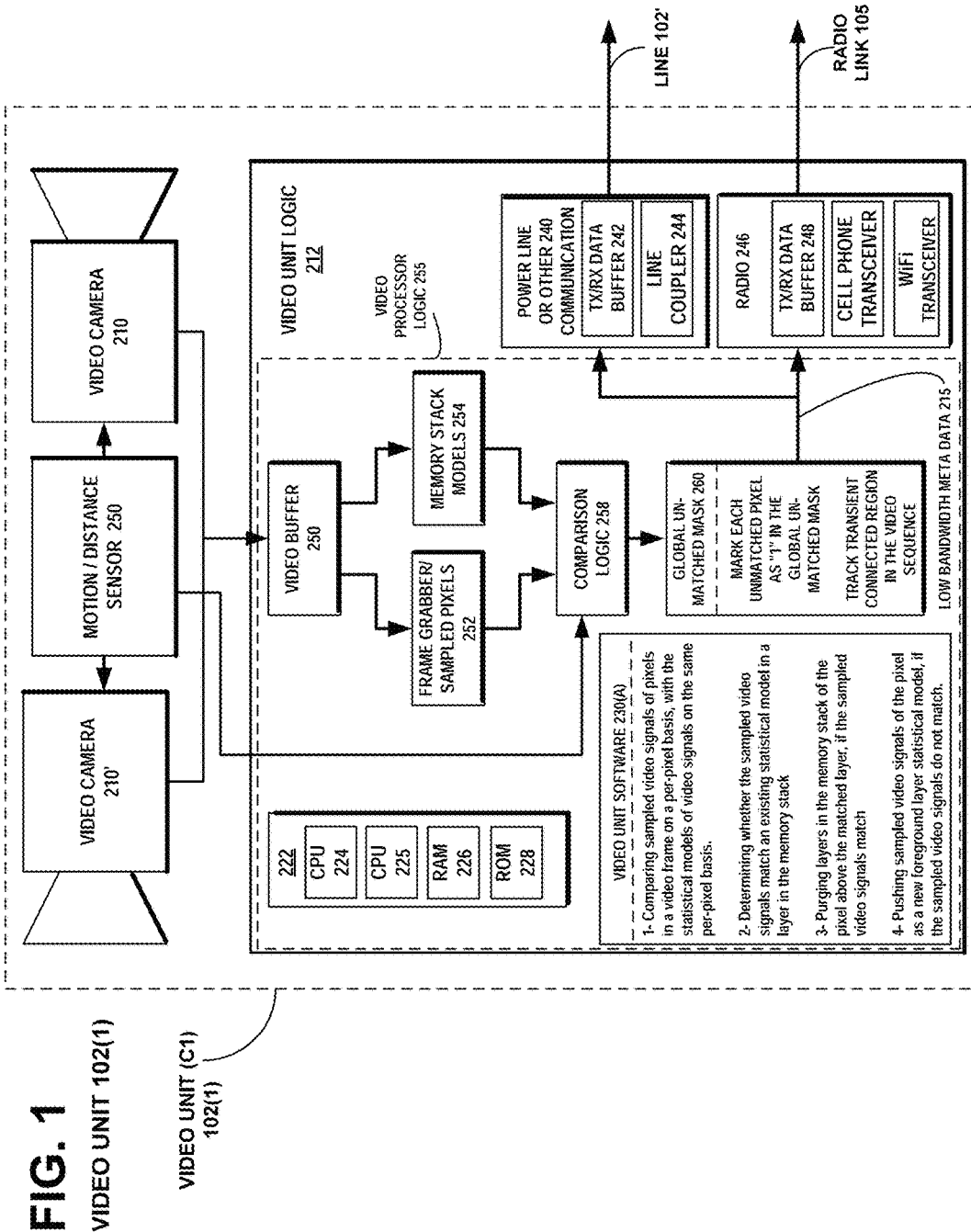

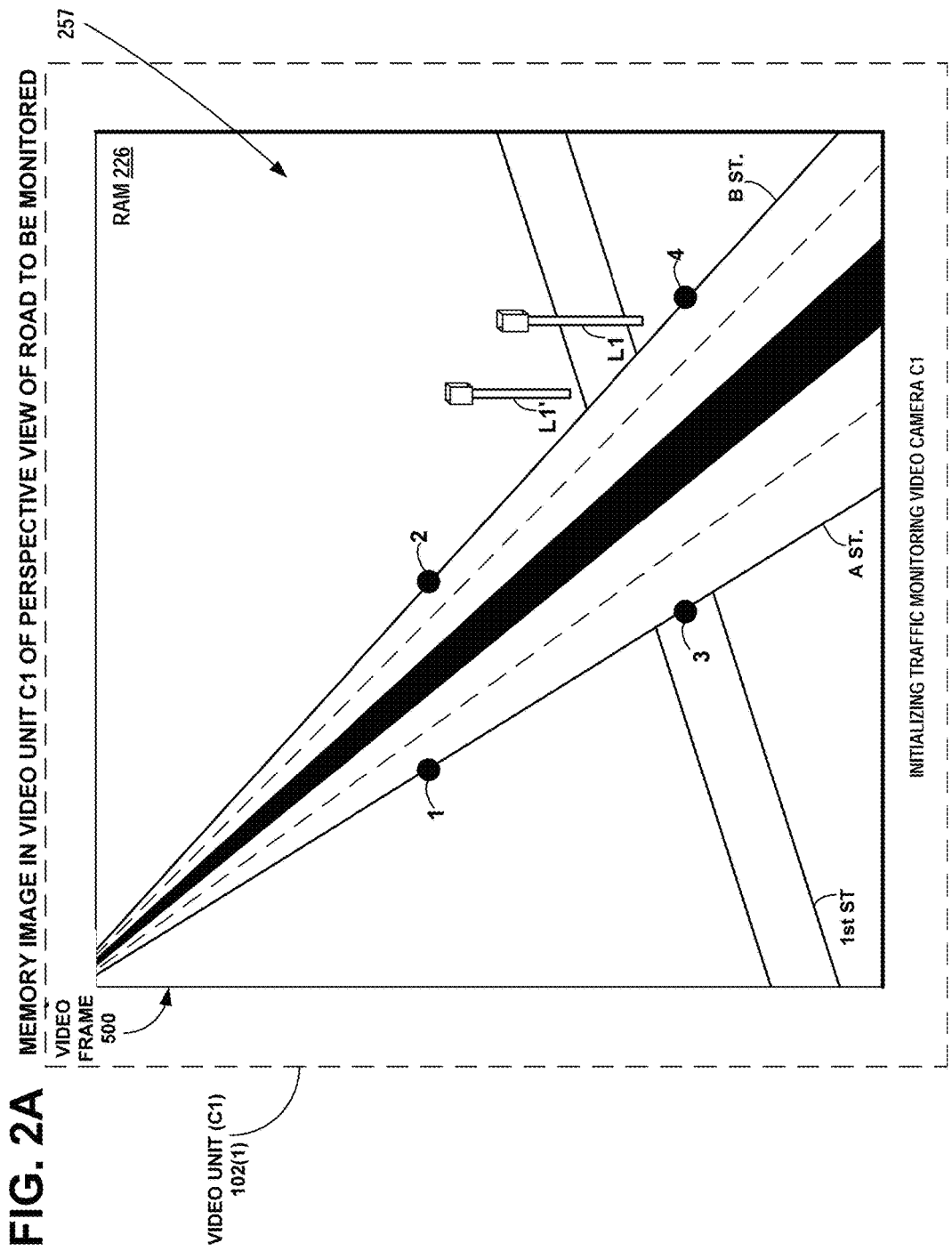

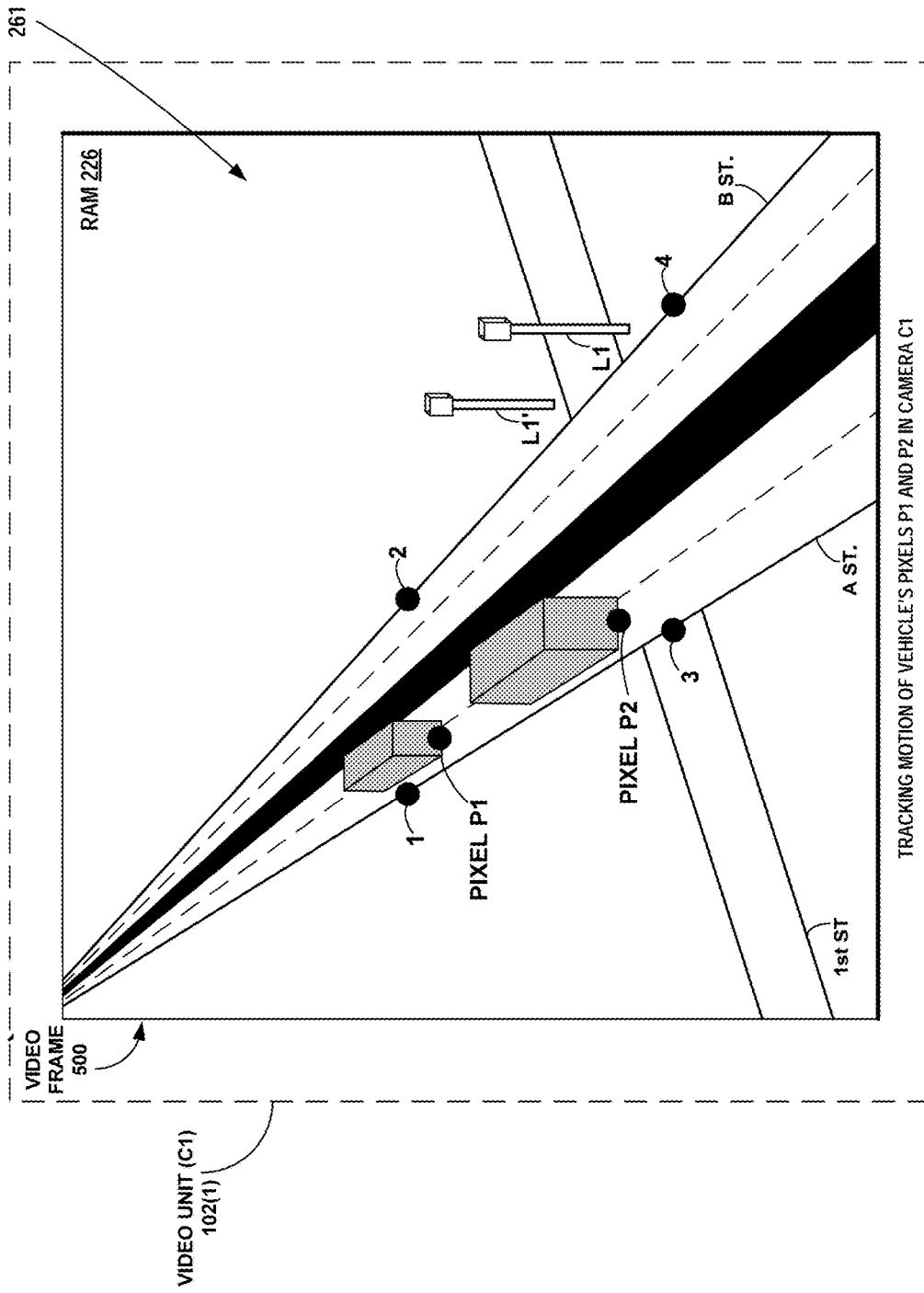

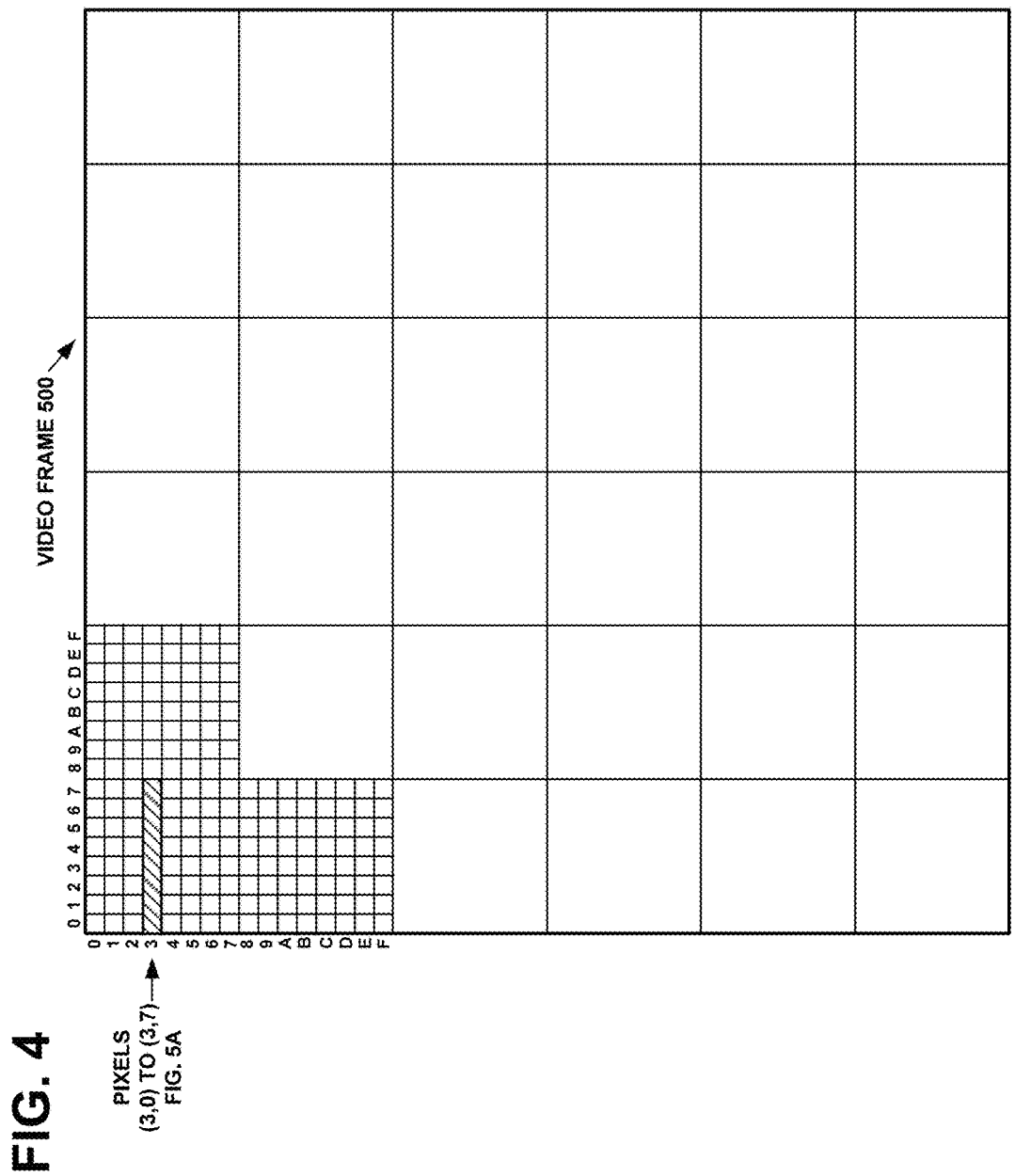

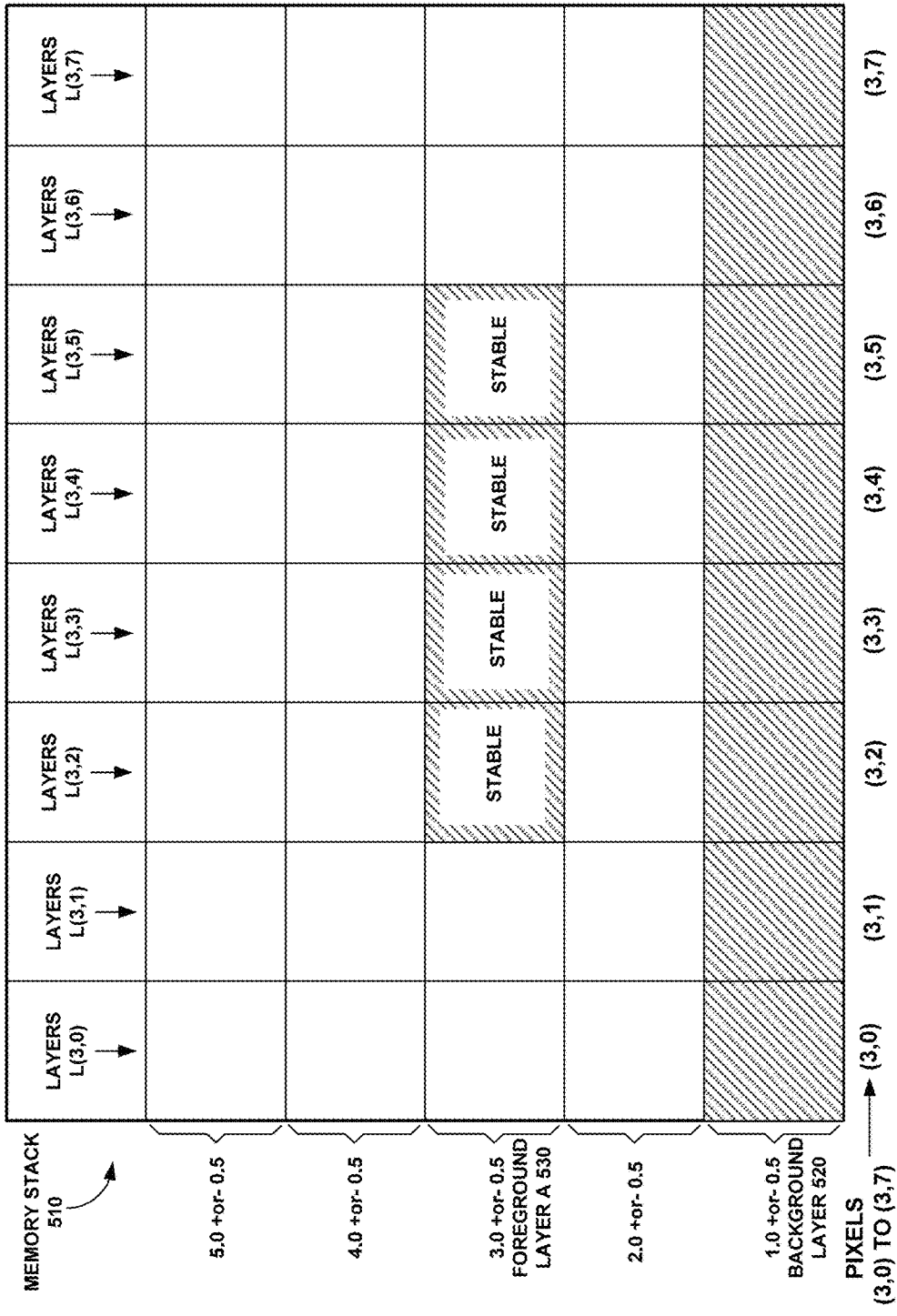

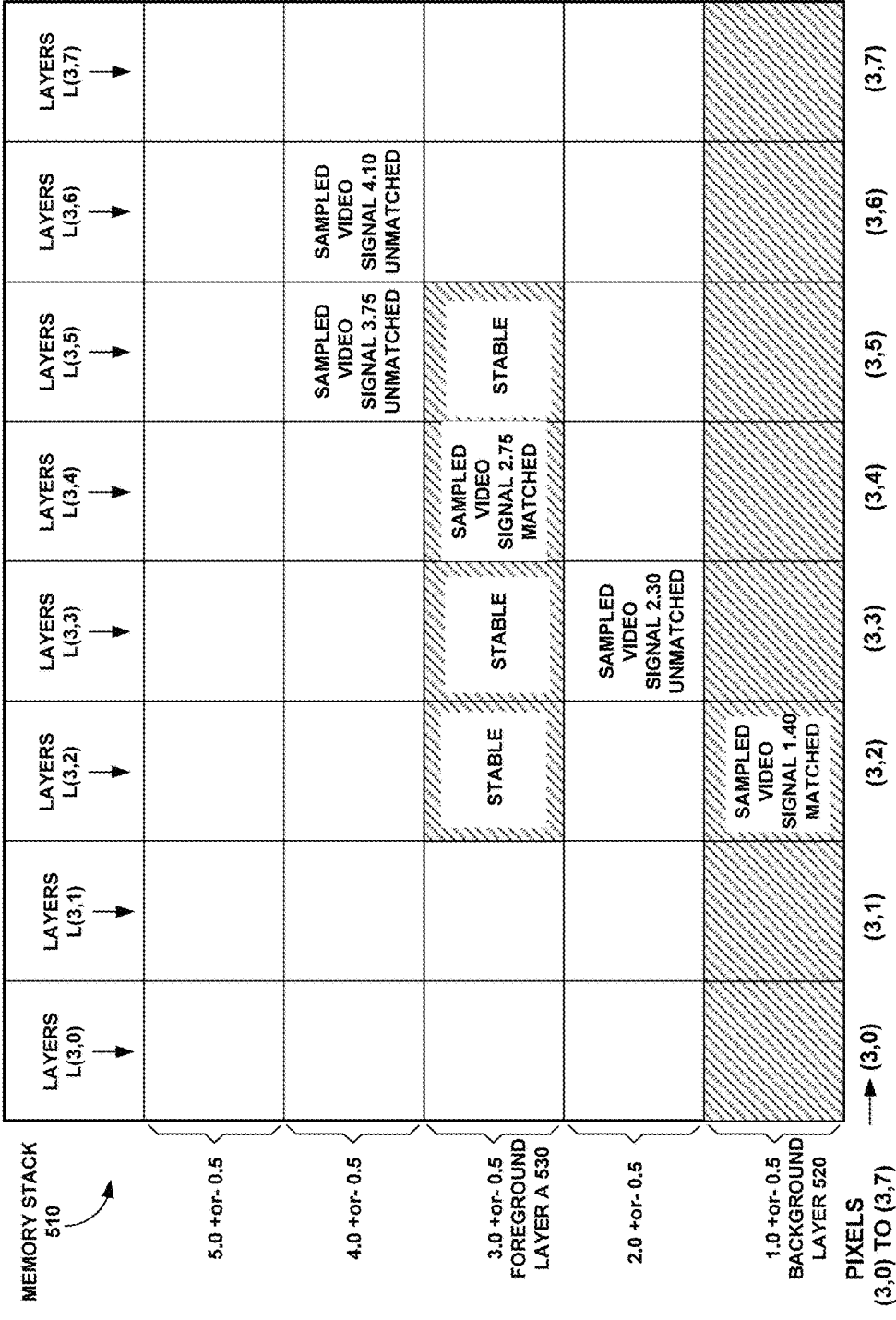

VIDEO DATA BACKGROUND TRACKING AND SUBTRACTION WITH MULTIPLE LAYERS OF STATIONARY FOREGROUND AND BACKGROUND REGIONS

FIELD OF THE INVENTION

The invention disclosed broadly relates to video analysis under a variety of shadow, color change, and lighting conditions. The invention more particularly relates to video monitoring of vehicular traffic, on the road or stationary such as within parking facilities. The invention is accomplished by comparing sampled video signals on a per-pixel basis for each video frame, with accumulated background and foreground Gaussian mixer models, such as Gaussian mixture model, of video signals on the same per-pixel basis for a sequence of video frames, to accurately identify foreground objects under a variety of motion, rain, snow, weather, shadow, color change, and lighting conditions.

BACKGROUND OF THE INVENTION

The ability to monitor vehicular traffic is important for many business and governmental purposes. Video monitoring may enable effective coordinated management of roads, traffic signals and even parking facilities. For example, to coordinate usage within a single parking structure, among multiple parking structures, on-street parking, or combinations of these. Video monitoring may provide timely and accurate information to adjust traffic signals among multiple intersections to alleviate local congestion and smooth traffic flows. Video monitoring can be used off-road within parking structures to identify hidden or unknown parking spaces, parking space occupancy, assign parking space categories, detect illegally (hazardously) parked cars, reduce inefficient use of parking capacity, enable spillover accommodation, adjust lighting, monitor handicap space availability, etc.

Video monitoring of moving vehicular traffic may enable real-time management of traffic flows, for example by the timing of traffic lights or redirection of traffic lanes. The accumulation of data from video monitored vehicular traffic may provide a basis for the design or redesign of roadways and associated structures.

Existing video monitoring techniques detect a moving object by comparing a sample of the image containing the moving object with previously stored images of the area being viewed. The previously stored images of the area being viewed may be described by a statistical model of the viewed area. Those portions of the sampled image that do not fit with the statistical model may be identified as foreground regions, a process referred to as background subtraction. Existing background subtraction techniques are based on static images and are mainly designed to identify non-moving objects. As any system also needs to learn variety of conditions (like weather, shadow, lighting etc) and modifications in background in parallel to detecting the foreground, existing background methods tend to merge the stationary foreground objects into background considering them as modified background. When moving objects are involved, the existing algorithms slowly merge the categorization of a stationary foreground region, into being categorized as a background region. Such existing techniques do not keep track of an identified foreground region, which is presently stationary, as continuing to be a foreground region. Existing techniques also have limitations due to wind, rain, reflections or illumination changes. In applications such as real-time traffic flow management, merger of foreground with background could inadvertently result in directing vehicular traffic into a collision with a foreground object that was erroneously categorized as background.

SUMMARY OF THE INVENTION

Example embodiments of the invention solve the problem of keeping track of an identified foreground region, which is presently stationary, as continuing to be a foreground region.

In accordance with an example embodiment of the invention, video monitoring of parking facilities or vehicular traffic is performed by comparing sampled video signals on a per-pixel basis for each of a sequence of video frames, with accumulated background detection method of video signals on the same per-pixel basis, to accurately identify foreground objects under a variety of shadow, color change, and lighting conditions. The number of video frames in the sequence may be adjusted and either increased to improve sensitivity of detection or decreased to speed up tracking a foreground region.

In accordance with an example embodiment of the invention, transient connected regions are tracked in a video sequence, marking them as a foreground layer or a background layer when the transient regions become stable. A stack of background/foreground Gaussian mixer models is maintained for each pixel. The decision to mark a stable region as a background layer or a new or existing foreground layer is done by matching the region with each model in the model stack. If the new region matches an existing model, then the layers above the matched layers are purged, or else the new region is pushed as a new foreground layer with a new model. The number of memory stack layers of background and foreground statistical models for a pixel may be adjusted by changing the range of values of video signals within each layer. The number of memory stack layers may be increased by reducing the range of values of video signals within layers to improve sensitivity of detection. The number of memory stack layers may be decreased by enlarging the range of values of video signals within layers to speed up tracking a foreground region.

In accordance with an example embodiment of the invention, in the event of natural area lighting changes, such as clouds rolling in or falling snow or rain, the gradual changes in natural lighting are considered to be stable and uniform, rather than causing objects to be categorized as moving objects. Thus, even if snow or rain is falling, the resulting gradual change in the ambient lighting does not affect matching a region with each model in the model stack. By contrast, the relatively faster changes in pixel lighting levels for a moving traffic object will cause the associated region to be correctly categorized as a foreground region. Moreover, the overall lighting state of a region (edge to edge) may have the same slow rate of change, indicating natural area lighting changes.

DESCRIPTION OF THE FIGURES

FIG. 1 illustrates an example embodiment of the invention, showing at least one video unit located at the thoroughfare or parking facility, including a video camera, video processor logic, a processor and memory including computer program code. The at least one video unit is configured to cause the video processor logic to process a video stream from the video camera while monitoring traffic events at a thoroughfare or monitoring events at a parking facility, to analyze the traffic monitoring event or parking facility event and to encode meta data characterizing the analysis of the event. The at least one video unit includes a communications unit configured to transmit data from the traffic monitoring event to a central controller or terminal.

FIG. 2A illustrates an example embodiment of the invention, showing initializing a traffic monitoring video camera from a perspective view of the camera viewing a roadway. The figure shows a memory image in a memory associated with the video camera, of the perspective view of the roadway to be monitored.

FIG. 2B illustrates an example embodiment of the invention of FIG. 2A, showing video monitoring of vehicular traffic by comparing sampled video signals on a per-pixel basis for each video frame, with accumulated background and foreground Gaussian mixer models of video signals on the same per-pixel basis for a sequence of video frames, to accurately identify foreground objects under a variety of shadow, color change, and lighting conditions.

FIG. 4 illustrates an example embodiment of the invention, showing a video frame and an arrangement of pixels, highlighting pixels (3,0) to (3,7), shown in FIG. 5A.

FIG. 5A shows pixels (3,0) to (3,7) of FIG. 4, illustrating a memory stack of layers of accumulated background and foreground statistical models of video signals for each pixel. The background layer and the foreground layer A are shown with initial stable state statistical models.

FIG. 5B shows pixels (3,0) to (3,7) of FIG. 5A, receiving sampled video signals in four of the pixels: (3,2), (3,3), (3,4), and (3,5).

DISCUSSION OF THE PREFERRED EMBODIMENTS

Figure 1A:
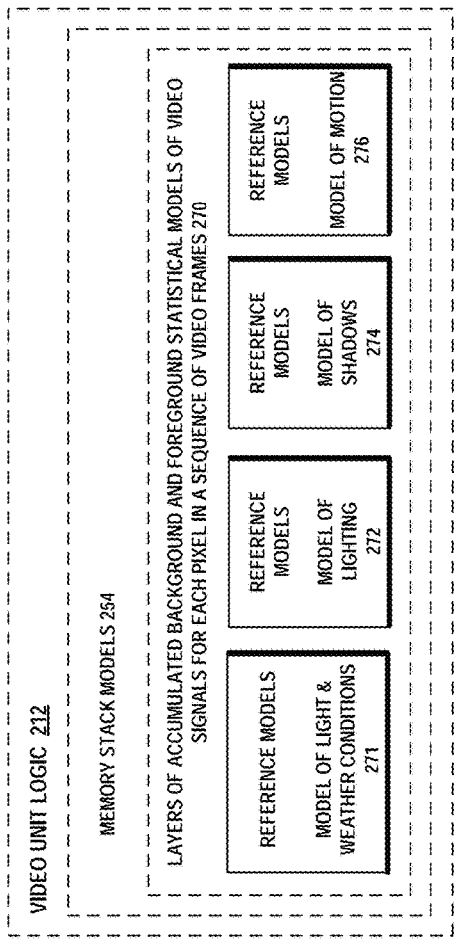
FIG. 1A illustrates an example embodiment of a memory stack models in the at least one video unit, the models comprising layers of accumulated background and foreground statistical models of video signals for each pixel in a sequence of video frames.

Example embodiments of the invention solve the problem of keeping track of an identified foreground region, which is presently stationary, as continuing to be a foreground region. When multiple video frames are analyzed, this facilitates better tracking of moving object speed and direction.

In accordance with an example embodiment of the invention, video monitoring of parking facilities or vehicular traffic is performed by comparing sampled video signals on a per-pixel basis for each video frame, with accumulated background and foreground Gaussian mixer models of video signals on the same per-pixel basis for a sequence of video frames, to accurately identify foreground objects under a variety of shadow, color change, and lighting conditions.

FIG. 1 illustrates an example embodiment of the invention, showing the at least one video unit 102(1) located in the geographic area of $1^{st}$ Street and $2^{nd}$ Street, and A Street, B Street, and C Street. The video unit 102(1) includes a video camera 210, a second video camera 210' and video processor logic 255 comprising a video buffer 250, frame grabber/sampled pixels 252, memory stack models 254, and comparison logic 258. The memory stack models 254 comprise layers of accumulated background and foreground statistical models of video signals for each pixel in a sequence of video frames, stored in the RAM 226. The models are learned models that characterize and catalog the detection and representation of objects in the background and foreground in various lighting, color temperature, shadow and other conditions. The video processor learns to more accurately mark and track the connected regions of pixels in the memory stack over many frames in in the video sequence.

The video cameras 210 and 210' comprise an image sensor plus a 3D sensor, including a red, green, blue (RGB) sensor plus an infrared (IR) sensor.

The memory stack models 254 shown in FIG. 1A, includes, but is not limited to, multiple reference models for different light and weather conditions 271, a model of lighting 272, a model of shadows 274, and a model of motion 276.

For example, the model of light and weather conditions 271 takes as an input, the current time of day and the level of solar illumination on cloudy versus sunny days. The light and weather model 271 correlates, over time, the background light level illuminating the through-fare, based on the time of day and the level of solar illumination. The light and weather model 271 assigns a score to various background light levels. For a current time of day and the level of solar illumination, the light and weather model 271 provides the corresponding score to the comparison logic 258, as one of the factors used by the comparison logic in determining the background or foreground category of the object being monitored.

Regions are a contiguous set of pixels from the image.

The background is the base image. For an example case that there are no cars on the road or in the parking slots, the background is the whole current image.

Foreground regions are the objects above the background, which may also be stacked over each other. One may think it of as a painter first painting the background, then painting the objects just above the background, then painting the objects over the background AND first layer of foreground objects.

The background as treated as a static physically immutable region (like the parking slots) and do not further segment it into background objects.

The memory stack models comprise layers of accumulated background and foreground statistical models of video signals for each pixel in a sequence of video frames. The statistical models may be Gaussian mixer model (GMM), which is a collection of many Gaussian distributions. An example each pixel may have a maximum of 5 Gaussian distributions associated with it, each of which is defined as a mean and variance (i.e., the square of the standard deviation). The Gaussian mixer model (GMM) assumes that any object pixel or background pixel may have many visual states (such as bright day, dark night, dawn, shadows, etc.) and the models of each of those states is a different Gaussian distribution. Both background pixels and foreground region pixels are modeled as Gaussian mixer models. For each pixel (x, y) of the image, embodiments of the invention store and track multiple GMM models of the background and the foreground object stacks above it. For example, if a pixel has a foreground with 2 objects, one in front of the other, and the background, there will be 3 GMM models, for a total of 3×5=15 Gaussian distributions.

Given a Background/Foreground model, a newly sampled pixel is classified as unmatched if it does not fall into Gaussian statistics of any of the stored Gaussian of that GMM or a combination of them. In a GMM with 5 Gaussian the pixel color value will be checked with 5 different Gaussian curves.

Matching is done at pixel level and region level for the foreground and background. Thus, even if a few noncontiguous pixels (with a tolerance such as 5%) do not match with the model, they are still classified as a match if most of the pixels in the whole region match. This type of match is classified as "Stable match", which happens when the objects are stable and non-moving.

If the pixels of a region in a new frame match stably with the existing most recently stored top model, then update the existing model of each pixel of the region to add statistics of the new pixels. For example, if the newly sampled pixel with a value 100 is matched with a Gaussian model of 90 mean and 10 variance and the "update influence" parameter is 0.1, then the Gaussian model mean is updated to 90*0.90+ 100*0.1=91.

For transient states:
A) A stable region goes into transient state when the pixels of region in new frame DO NOT match with any GMM in the stack (more than 5% do not match). In that case a transient GMM is added to the stack with the new pixels.
B) A region in transient state remains in transient state if the new pixels do not match with the top transient model or any model in the stack. The new pixels are still updated into transient GMM.
C) If the new further sampled pixels of a transient region match stably with the transient model then we mark the region as stable and add the transient model as a stable object on the stack.
D) If the new pixels of a transient region match stably with older GMM on the stack then we mark the region as stable and purge all the above models on the stack.

The number of memory stack layers of background and foreground statistical models for a pixel may be adjusted by changing the range of values of video signals within each layer. The number of memory stack layers may be increased by reducing the range of values of video signals within layers to improve sensitivity of detection. The number of memory stack layers may be decreased by enlarging the range of values of video signals within layers to speed up tracking a foreground region.

The number of video frames in the sequence may be adjusted and either increased to improve sensitivity of detection or decreased to speed up tracking a foreground region.

Gaussian mixer models (GMM) are described, for example in Zivkovic, Z. (2004, August). "Improved adaptive Gaussian mixture model for background subtraction" *Pattern Recognition,* 2004. ICPR 2004. Proceedings of the 17th International Conference on, 2, pp. 28-31 Vol. 2. doi: 10.1109/ICPR.2004.1333992.

Figure 1B:
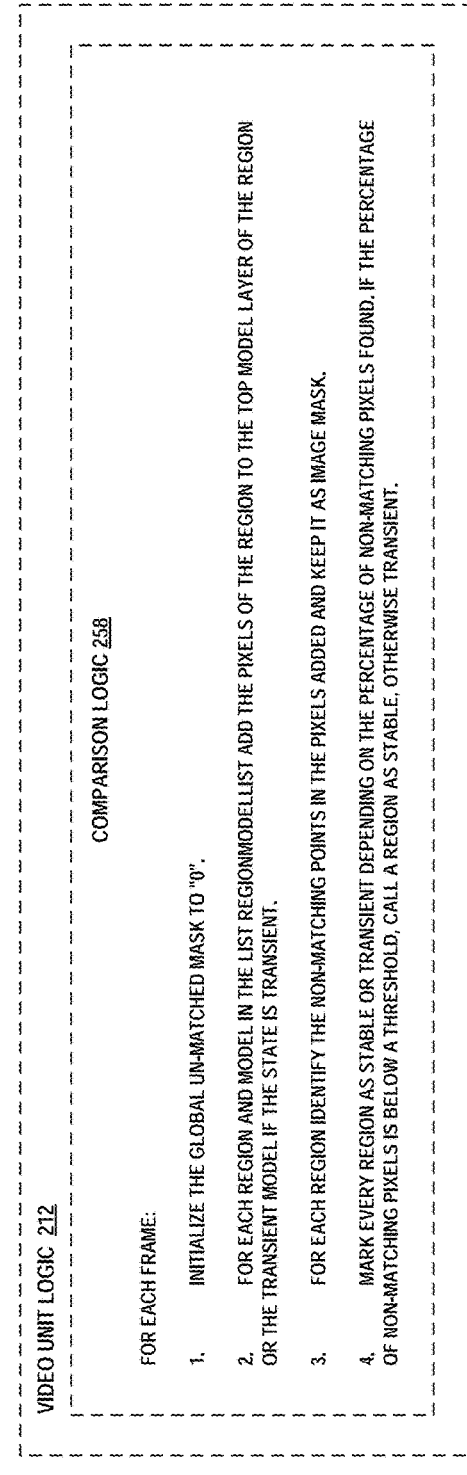
FIG. 1B illustrates an example embodiment of comparison logic in the at least one video unit.

The comparison logic 258 shown in FIG. 1B, makes determinations for each frame:
1. Initialize the global un-matched mask to "0".
2. For each region and model in the list RegionModelList add the pixels of the region to the top model layer of the region or the transient model if the state is transient.
3. For each region identify the non-matching points in the pixels added and keep it as image mask.
4. Mark every region as stable or transient depending on the percentage of non-matching pixels found. If the percentage of non-matching pixels is below a threshold, call a region as stable, otherwise transient.

The comparison logic 258 is a program construct stored in the RAM 226. The comparison logic 258 provides outputs to the global un-matched mask 260 to:
Mark each unmatched pixel as "1" in the global un-matched mask
Track transient connected region in the video sequence The video unit 102(1) is configured to encode a preferably low bandwidth message characterizing monitored events. The video unit 102(1) includes a power line or other low bandwidth medium communications unit 240 that includes a transmit/receive (TX/RX) buffer 242 and a power line or other low bandwidth medium coupler 244, configured to transmit the low bandwidth message to a management controller or terminal over power line or other low bandwidth medium 102'. In an alternate embodiment, the video unit 102(1) includes a radio unit 246 that includes a transmit/receive (TX/RX) buffer 248, a cell phone transceiver, and a WiFi transceiver, which are configured to transmit the low bandwidth message to a management controller or terminal over a radio link 105.

The video unit 102(1) includes a processor 222 comprising a dual central processor unit (CPU) or multi-CPU 224/225, a random access memory (RAM) 226 and read only memory (ROM) 228. The memories 226 and/or 228 include computer program code, including video unit software 230(A).

The video unit software 230(A) includes example instructions such as the following:
1—Comparing sampled video signals of pixels in a video frame on a per-pixel basis, with the statistical models of video signals on the same per-pixel basis.
2—Determining whether the sampled video signals match an existing statistical model in a layer in the memory stack
3—Purging layers in the memory stack of the pixel above the matched layer, if the sampled video signals match
4—Pushing sampled video signals of the pixel as a new foreground layer statistical model, if the sampled video signals do not match.

In accordance with an example embodiment of the invention, in the event of natural area lighting changes, such as clouds rolling in or falling snow or rain, the gradual changes in natural lighting are considered to be stable and uniform, rather than causing objects to be categorized as moving objects. Thus, even if snow or rain is falling, the resulting gradual change in the ambient lighting does not affect matching a region with each model in the model stack. By contrast, the relatively faster changes in pixel lighting levels for a moving traffic object will cause the associated region to be correctly categorized as a foreground region. Moreover, the overall lighting state of a region (edge to edge) may have the same slow rate of change, indicating natural area lighting changes. For example, even if the snow or rain is falling, it still stably matches with a region. For example, assuming a 1% tolerance, then natural changes will need 100 frames=3-4 seconds to completely change colors of region. On the other hand, the moving traffic object changes are much faster OR random. A car may pull into a parking slot in less than a second from outside the slot. Even if it is slower, the car does not move into a slot in 4 seconds at an extremely uniform velocity AND does not impact the region overall or change pixels from one edge, contiguously.

FIG. 2A illustrates an example embodiment of the invention, showing an initial step in commissioning a traffic monitoring video camera C1 102(1) from a perspective view of the camera viewing a roadway. The figure shows a memory image 257 in a memory 226 associated with a video frame 500 in the video camera C1 102(1), of the perspective view of the roadway to be monitored. The following example steps are performed to initialize the video monitoring of vehicular traffic.

Create a list of regions and models in a video sequence as RegionModelList. Each region has:

```
Region = {
List of pixels in the region,
Stack: Stable models,
State: Stable or transient,
Transient model: If the state is transient.
Number of transient frames
}
```

Create a global un-matched mask.

Initialize the list with a single connected region and mark it as background:

FIG. 2B illustrates an example embodiment of the invention of FIG. 2A, showing video monitoring of vehicular traffic by comparing sampled video signals on a per-pixel basis for each video frame, with accumulated background and foreground Gaussian mixer models of video signals on the same per-pixel basis for a sequence of video frames, to accurately identify foreground objects under a variety of shadow, color change, and lighting conditions.

The figure shows a memory image 261 in the memory associated with a video frame 500 in the video camera C1 102(1), of the perspective view of a vehicle moving along the roadway to be monitored. The figure shows tracking the motion of the image of the vehicle pixels P1 and P2 at two consecutive locations, as seen in the camera. The base of the detected vehicle may be used to estimate its speed and position on the road. For example, use a mapping between pixel motions in camera to map coordinates to estimate vehicle speeds.

Table A, below, shows an example of the steps for background tracking and subtraction in of non-moving background and multi-layered foreground regions.

Figure 3:
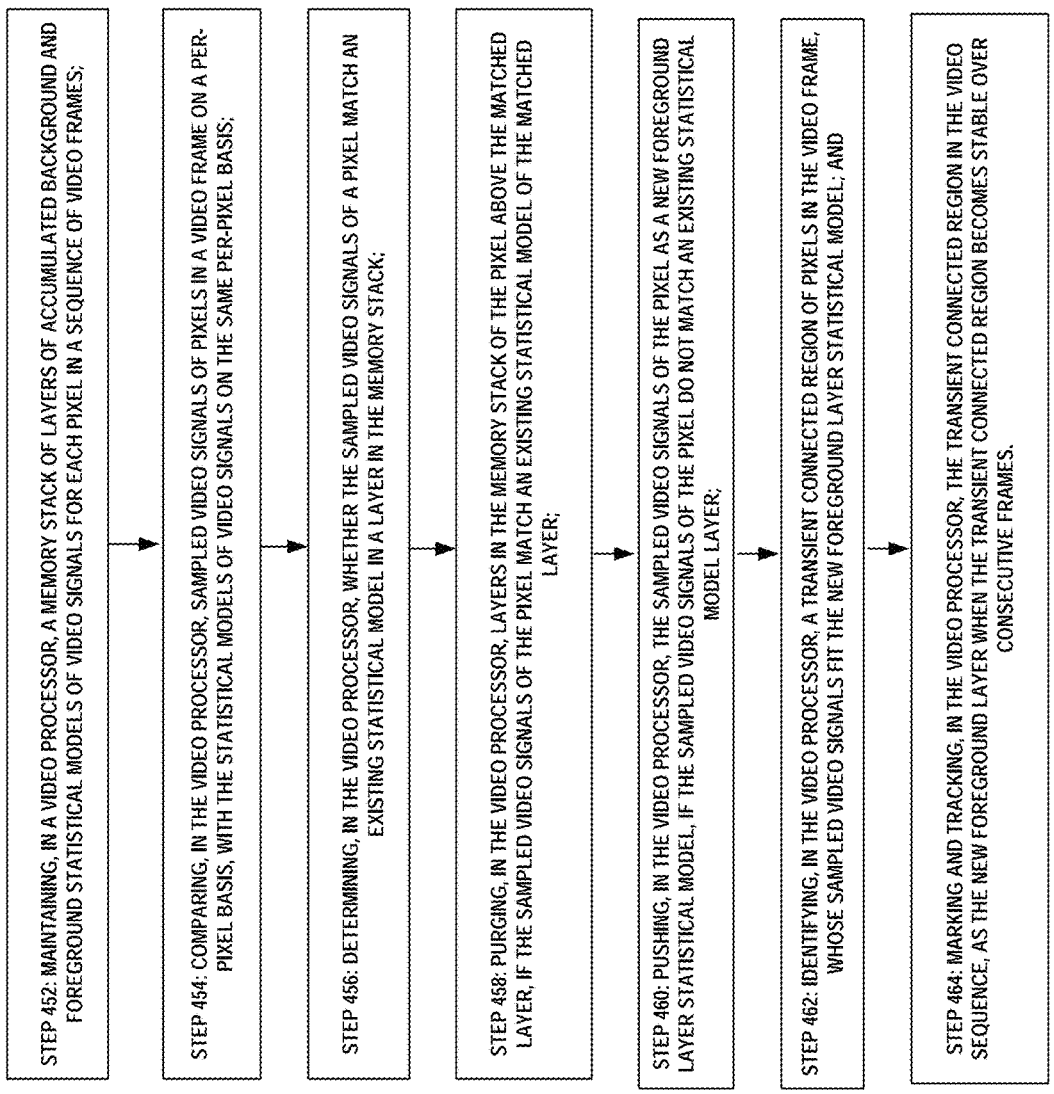
FIG. 3 illustrates an example embodiment of the invention, showing a flow diagram of an example process to commission a traffic monitoring video camera.

FIG. 3 illustrates an example embodiment of the invention, showing a flow diagram 450 of an example method of tracking a foreground region in a video frame. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 452: maintaining, in a video processor, a memory stack of layers of accumulated background and foreground statistical models of video signals for each pixel in a sequence of video frames;

Step 454: comparing, in the video processor, sampled video signals of pixels in a video frame on a per-pixel basis, with the statistical models of video signals on the same per-pixel basis;

Step 456: determining, in the video processor, whether the sampled video signals of a pixel match an existing statistical model in a layer in the memory stack;

Step 458: purging, in the video processor, layers in the memory stack of the pixel above the matched layer, if the sampled video signals of the pixel match an existing statistical model of the matched layer;

Step 460: pushing, in the video processor, the sampled video signals of the pixel as a new foreground layer statistical model, if the sampled video signals of the pixel do not match an existing statistical model of the matched layer;

Step 462: identifying, in the video processor, a transient connected region of pixels in the video frame, whose sampled video signals fit the new foreground layer statistical model; and Step 464: marking and tracking, in the video processor, the transient connected region in the video sequence, as the new foreground layer when the transient connected region become stable over consecutive frames.

FIG. 4 illustrates an example embodiment of the invention, showing a video frame 500 and an arrangement of pixels, highlighting pixels (3,0) to (3,7), shown in FIG. 5A. The figure shows a memory image of the pixels in the memory 226 associated with the video camera C1 102(1). The coordinates of the pixels have their origin at the upper left corner of the frame 500 and are shown numbered in hexadecimal notation in the horizontal x-direction and the vertical y-direction.

FIG. 5A shows pixels (3,0) to (3,7) of FIG. 4, illustrating an example memory stack 510 of layers L(3,0) to L(3,7) of accumulated background and foreground statistical models of video signals for each pixel (3,0) to (3,7). The background layer 520 and the foreground layer A 530 are shown with initial stable state statistical models. The background layer 520 represents stable state statistical models having a video signal value within the range of 1.0+or−0.5 in each pixel (3,0) to (3,7). The foreground layer A 530 represents stable state statistical models having a video signal value within the range of 3.0+or−0.5 in pixels (3,2), (3,3), (3,4), and (3,5).

FIG. 5B shows pixels (3,0) to (3,7) of FIG. 5A, receiving sampled video signals in five of the pixels: (3,2), (3,3), (3,4), (3,5), and (3,6). Pixel (3,2) has received a sampled video signal value of 1.40, which matches the stable state statistical model within the range of 1.0+or−0.5 for the background layer 520.

Pixel (3,3) has received a sampled video signal value of 2.30, which does not match any of the current layers of statistical models.

Pixel (3,4) has received a sampled video signal value of 2.75, which matches the stable state statistical model within the range of 3.0+or−0.5 for the foreground layer A 530.

Pixel (3,5) has received a sampled video signal value of 3.75, which does not match any of the current layers of statistical models.

Pixel (3,6) has received a sampled video signal value of 4.10, which does not match any of the current layers of statistical models.

Figure 5C:
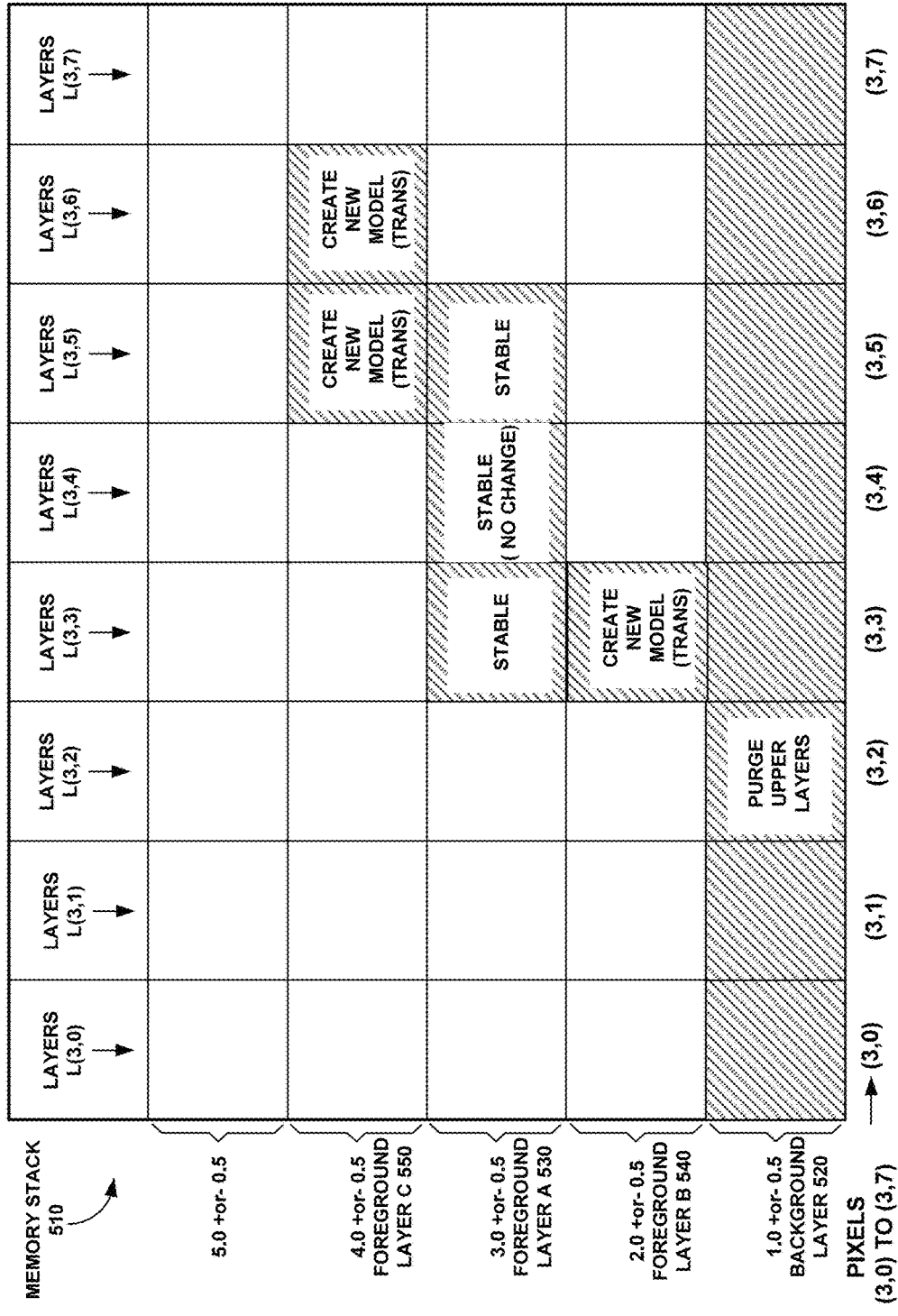
FIG. 5C shows pixels (3,0) to (3,7) of FIG. 5A, illustrating the resulting states for the statistical models of the four pixels (3,2), (3,3), (3,4), and (3,5).

FIG. 5C shows pixels (3,0) to (3,7) of FIG. 5A, illustrating the resulting states for the statistical models of the five pixels (3,2), (3,3), (3,4), (3,5) and (3,6).

Pixel (3,2) purges the upper layers above the background layer 520, purging layers in the memory stack of the pixel above the matched layer, since the sampled video signals of the pixel match the existing statistical model of the matched layer.

Pixel (3,3) creates a new transient statistical model layer B 540 within the range of 2.0+or−0.5, pushing the sampled video signals of the pixel as a new foreground layer statistical model, since the sampled video signals of the pixel do not match an existing statistical model layer.

Pixel (3,4) remains in the stable state statistical model with the range of 3.0+or−0.5 for the foreground layer A 530.

Pixel (3,5) creates a new transient statistical model layer C 550 within the range of 4.0+or−0.5, pushing the sampled video signals of the pixel as a new foreground layer statistical model, since the sampled video signals of the pixel do not match an existing statistical model layer.

Pixel (3,6) creates a new transient statistical model layer C 550 within the range of 4.0+or−0.5, pushing the sampled video signals of the pixel as a new foreground layer statistical model, since the sampled video signals of the pixel do not match an existing statistical model layer.

In this manner, video processor learns to more accurately mark and track the connected regions of pixels in the memory stack over many frames in the video sequence.

Figure 6A:
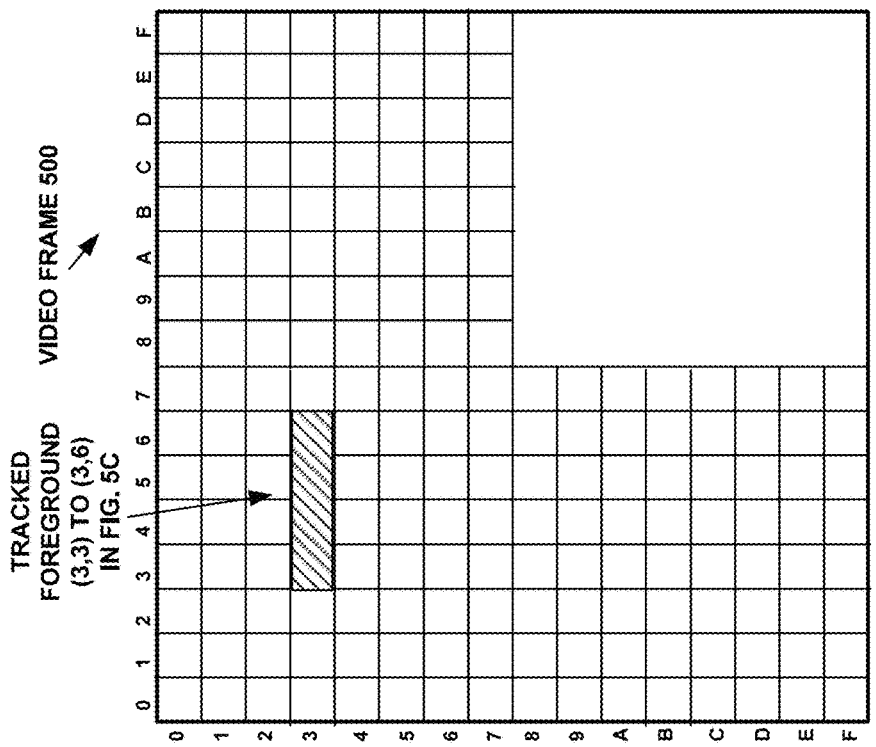
FIG. 6A illustrates apportion of the video frame of FIG. 4, showing the initial foreground of pixels (3,2) to (3,5) shown in FIG. 5A.

FIG. 6A illustrates apportion of the video frame of FIG. 4, showing the initial foreground of pixels (3,2) to (3,5) shown in FIG. 5A.

Figure 6B:
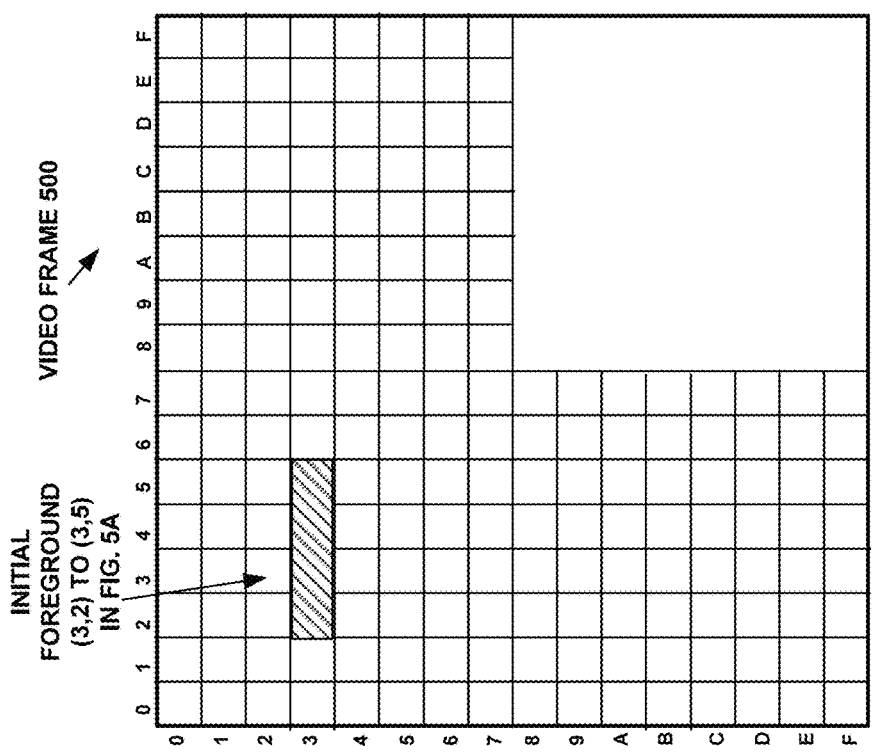
FIG. 6B illustrates apportion of the video frame of FIG. 4, showing the resulting tracked foreground of pixels (3,3) to (3,6) shown in FIG. 5C.

FIG. 6B illustrates apportion of the video frame of FIG. 4, showing the resulting tracked foreground of pixels (3,3) to (3,6) shown in FIG. 5C. The process continues by identifying a transient connected region of pixels in the video frame, whose sampled video signals fit the new foreground layer statistical model. The transient connected region is marked and tracked in the video sequence, as the new foreground layer when the transient connected region becomes stable over consecutive frames.

In an example embodiment of the invention, Table A shows an un-supervised method to correct background tracking and subtraction in the case of non-moving background and multi-layered foreground regions. The invention performs tracking of transient connected regions in a video sequence, marking them as foreground layer or background layer when the transient regions become stable and maintaining a stack of background/foreground models. The decision of marking a stable region as background layer or new or existing foreground layer is done by matching the region with each model in the model stack. If the new region matches an existing model, the layers above it are purged. Alternately, the new region is pushed as a new foreground layer with a new model.

TABLE A

An un-supervised method to correct background tracking and subtraction in the case of non-moving background and multi-layered foreground regions.

1. Create a list of regions and models in a video sequence as RegionModelList. Each region has:
   Region = {
   List of pixels in the region,
   Stack: Stable models,
   State: Stable or transient,
   Transient model: If the state is transient.
   Number of transient frames
   }
2. Create a global un-matched mask.

Initialization:
3. Initialize the list with a single connected region and mark it as background:
   RegionModelList = {
      1. Region1: PointMask of the whole image, background model, state: stable.
   }.

For each frame:
4. Initialize the global un-matched mask to "0".
5. For each region and model in the list RegionModelList add the pixels of the region to the top model layer of the region or the transient model if the state is transient.
6. For each region identify the non-matching points in the pixels added and keep it as image mask.
7. Mark every region as stable or transient depending on the percentage of non-matching pixels found. If the percentage of non-matching pixels is below a threshold we call a region as stable otherwise transient.
8. If some regionK is stable and was previously do nothing for it. Mark each unmatched pixel to as "1" in the global un-matched mask.
9. If some regionK is stable but was earlier transient, then we delete the transient model and match the pixels inside the regionK with all the current models in the model stack of regionK. For all matched models (number of non-matching pixels is below a threshold) we find the best match. If there is match, then we purge the upper layers of the best match model. If the best match is the lowest model in stack, which is the background, we delete the region. If the best match is not the lowest element in the stack, then we add the new pixels of region to the best matched model. If no model matches, then we can create a new model with adding the pixel of the new frame and pushing the model in the model stack. Mark each unmatched pixel from the best match or new model to as "1" in the global un-matched mask.
10. If some regionK is transient but was earlier stable, we clone the top model from the stack of models as transient model. Mark each unmatched pixel from the best match or new model to as "1" in the global un-matched mask.
11. If some regionK is transient and was earlier transient do nothing. Mark each unmatched pixel from the best match or new model to as "1" in the global un-matched mask.
12. Use morphological transforms on the global un-matched mask to reduce noise and fill holes.
13. Identify large independent connected components in the unmatched region using some blob finding algorithm and make a list of them as {newregion1, newregion2, .., newregionN}.
14. If a new region has a large overlap with an existing region AND is similar size to the existing region AND most pixels of the non-overlap portion of the existing region are un-matched, then remove the existing region. <This means that it is same foreground object layer>
15. If a new region has a large overlap with an existing region AND is similar size to the existing region AND most pixels of the non-overlap portion of the existing region are matched, then add new region to the region list. <This means that there is another layer of foreground above the existing layer>.
16. If a new region is contained in an existing region AND not similar size to the existing region and most pixels of the non-overlap portion of the existing region, then add the new region.

TABLE A-continued

An un-supervised method to correct background tracking and subtraction in
the case of non-moving background and multi-layered foreground regions.

17. If the new region contains an existing region AND much larger than the existing region, then add the new region.
18. Otherwise add the new region (partial overlap or no overlap).
    RegionModelList = {
    - Region1,
    - Region2,
    - ...
    - RegionN
    }

Some possible region models and matching algorithms (but not limited to):
1. Mixture of Gaussian and its variants, including detection and tracking of shadows.
2. Single or multiple collection of pixel colors for a set of pixels in a region/frame with
   direct subtraction or statistical correlation.
3. Collection of textures for all or highly textured pixels for a set of pixels in a region/frame.
4. Match descriptors like SURF, SIFT for all or highly textured pixel in a region/frame.
5. Graph flow models like used in graph-cut and grab-cut.

Although specific example embodiments of the invention have been disclosed, persons of skill in the art will appreciate that changes may be made to the details described for the specific example embodiments, without departing from the spirit and the scope of the invention.

What is claimed is:

1. A method of tracking a foreground region in a video frame, comprising:
    maintaining, in a video processor, a memory stack of layers of accumulated background and foreground statistical models of video signals for each pixel in a sequence of video frames, wherein the accumulated background and foreground statistical models include a model of light and weather conditions;
    assigning, in the video processor, a score to each of a plurality of background light levels;
    determining, by the video processor, a current score for a current background light level corresponding to a current time of day and level of solar illumination;
    comparing, in the video processor, sampled video signals of pixels in a video frame on a per-pixel basis, with the statistical models of video signals on the same per-pixel basis, using the current score for the current background light level;
    determining, in the video processor, whether the sampled video signals of a pixel match an existing statistical model in a layer in the memory stack;
    purging, in the video processor, layers in the memory stack of the pixel above the matched layer, if the sampled video signals of the pixel match an existing statistical model of the matched layer;
    pushing, in the video processor, the sampled video signals of the pixel as a new foreground layer statistical model, if the sampled video signals of the pixel do not match an existing statistical model layer;
    identifying, in the video processor, a transient connected region of pixels in the video frame, whose sampled video signals fit the new foreground layer statistical model; and
    marking and tracking, in the video processor, the transient connected region in the video sequence, as the new foreground layer when the transient connected region becomes stable over consecutive frames.

2. The method of claim 1, wherein gradual changes in natural lighting do not affect matching a pixel to an existing statistical model in a layer in the memory stack, whereas relatively faster changes in pixel lighting levels for a moving object cause the pixel to be categorized as a foreground region.

3. The method of claim 1, wherein sensitivity of detection is improved by increasing the number of memory stack layers of background and foreground statistical models for a pixel, or tracking a foreground region is sped up by decreasing the number of memory stack layers of background and foreground statistical models for a pixel.

4. The method of claim 3, wherein the number of memory stack layers is increased by reducing a range of values of video signals within the layers to improve sensitivity of detection.

5. The method of claim 3, wherein the number of memory stack layers is decreased by enlarging a range of values of video signals within the layers to speed up tracking a foreground region.

6. The method of claim 1, wherein the number of video frames in the sequence is adjusted and either increased to improve sensitivity of detection or decreased to speed up tracking a foreground region.

7. The method of claim 1, wherein the video processor learns to more accurately mark and track the connected regions of pixels in the memory stack over many frames in the video sequence.

8. A computer program product comprising computer executable program code recorded on a computer readable, non-transitory storage medium, for tracking a foreground region in a video frame, the computer executable program code comprising:
    code for maintaining, in a video processor, a memory stack of layers of accumulated background and foreground statistical models of video signals for each pixel in a sequence of video frames, wherein the accumulated background and foreground statistical models include a model of light and weather conditions;
    code for assigning, in the video processor, a score to each of a plurality of background light levels:
    code for determining, by the video processor, a current score for a current background light level corresponding to a current time of day and level of solar illumination;
    code for comparing, in the video processor, sampled video signals of pixels in a video frame on a per-pixel basis, with the statistical models of video signals on the same per-pixel basis, using the current score for the current background light level;

code for determining, in the video processor, whether the sampled video signals of a pixel match an existing statistical model in a layer in the memory stack;

code for purging, in the video processor, layers in the memory stack of the pixel above the matched layer, if the sampled video signals of the pixel match an existing statistical model of the matched layer;

code for pushing, in the video processor, the sampled video signals of the pixel as a new foreground layer statistical model, if the sampled video signals of the pixel do not match an existing statistical model layer;

code for identifying, in the video processor, a transient connected region of pixels in the video frame, whose sampled video signals fit the new foreground layer statistical model; and code for marking and tracking, in the video processor, the transient connected region in the video sequence, as the new foreground layer when the transient connected region becomes stable over consecutive frames.

9. The computer program product of claim 8, wherein gradual changes in natural lighting do not affect matching a pixel to an existing statistical model in a layer in the memory stack, whereas relatively faster changes in pixel lighting levels for a moving object cause the pixel to be categorized as a foreground region.

10. The computer program product of claim 8, wherein sensitivity of detection is improved by increasing the number of memory stack layers of background and foreground statistical models for a pixel, or tracking a foreground region is sped up by decreasing the number of memory stack layers of background and foreground statistical models for a pixel.

11. The computer program product of claim 10, wherein the number of memory stack layers is increased by reducing a range of values of video signals within the layers to improve sensitivity of detection.

12. The computer program product of claim 10, wherein the number of memory stack layers is decreased by enlarging a range of values of video signals within the layers to speed up tracking a foreground region.

13. The computer program product of claim 8, wherein the number of video frames in the sequence is adjusted and either increased to improve sensitivity of detection or decreased to speed up tracking a foreground region.

14. The computer program product of claim 8, wherein the video processor learns to more accurately mark and track the connected regions of pixels in the memory stack over many frames in the video sequence.

15. An apparatus for tracking a foreground region in a video frame, comprising:

a video unit located within viewing distance of at least one thoroughfare or parking facility to be monitored, including a video camera, video processor, a processor and memory including computer program code configured to cause the video processor to process a video stream from the video camera;

a memory stack of layers of accumulated background and foreground statistical models of video signals for each pixel in a sequence of video frames, wherein the accumulated background and foreground statistical models include a model of light and weather conditions;

the video processor assigning a score to each of a plurality of background light levels;

the video processor determining a current score for a current background light level corresponding to a current time of day and level of solar illumination;

the video processor comparing sampled video signals of pixels in a video frame on a per-pixel basis, with the statistical models of video signals on the same per-pixel basis, using the current score for the current background light level;

the video processor determining whether the sampled video signals of a pixel match an existing statistical model in a layer in the memory stack;

the video processor purging layers in the memory stack of the pixel above the matched layer, if the sampled video signals of the pixel match an existing statistical model of the matched layer;

the video processor pushing the sampled video signals of the pixel as a new foreground layer statistical model, if the sampled video signals of the pixel do not match an existing statistical model layer;

the video processor identifying a transient connected region of pixels in the video frame, whose sampled video signals fit the new foreground layer statistical model; and the video processor marking and tracking the transient connected region in the video sequence, as the new foreground layer when the transient connected region becomes stable over consecutive frames.

16. The apparatus of claim 15, wherein gradual changes in natural lighting do not affect matching a pixel to an existing statistical model in a layer in the memory stack, whereas relatively faster changes in pixel lighting levels for a moving object cause the pixel to be categorized as a foreground region.

17. The apparatus of claim 15, wherein sensitivity of detection is improved by increasing the number of memory stack layers of background and foreground statistical models for a pixel, or tracking a foreground region is sped up by decreasing the number of memory stack layers of background and foreground statistical models for a pixel.

18. The apparatus of claim 17, wherein the number of memory stack layers is increased by reducing a range of values of video signals within the layers to improve sensitivity of detection.

19. The apparatus of claim 17, wherein the number of memory stack layers is decreased by enlarging a range of values of video signals within the layers to speed up tracking a foreground region.

20. The apparatus of claim 15, wherein the number of video frames in the sequence is adjusted and either increased to improve sensitivity of detection or decreased to speed up tracking a foreground region.

21. The apparatus of claim 15, wherein the video processor learns to more accurately mark and track the connected regions of pixels in the memory stack over many frames in the video sequence.

* * * * *